(12) United States Patent
Johnson et al.

(10) Patent No.: US 8,430,505 B2
(45) Date of Patent: Apr. 30, 2013

(54) CURVED LENSES CONFIGURED TO DECODE THREE-DIMENSIONAL CONTENT

(75) Inventors: David A. Johnson, Del Mar, CA (US); James Pritts, Emerald Hills, CA (US)

(73) Assignee: MEI 3D, LLC, Melville, NY (US)

( * ) Notice: Subject to any disclaimer, the term of this patent is extended or adjusted under 35 U.S.C. 154(b) by 90 days.

(21) Appl. No.: 13/103,036

(22) Filed: May 6, 2011

(65) Prior Publication Data
US 2012/0050858 A1 Mar. 1, 2012

Related U.S. Application Data

(63) Continuation-in-part of application No. 12/350,092, filed on Jan. 7, 2009, now Pat. No. 7,950, 798.

(60) Provisional application No. 61/019,545, filed on Jan. 7, 2008.

(51) Int. Cl.
*G02C 7/12* (2006.01)

(52) U.S. Cl.
USPC .............. 351/49; 351/159.6; 351/159.62; 359/489.07

(58) Field of Classification Search ............ 351/41, 351/44, 49, 163, 159.59, 159.6, 159.62; 359/483.01, 359/485.03, 489.01, 489.02, 489.07; 264/1.32
See application file for complete search history.

(56) References Cited

U.S. PATENT DOCUMENTS

| | | |
|---|---|---|
| 2,099,694 A | 12/1937 | Land |
| 2,431,942 A | 12/1947 | Land |
| 4,564,408 A | 1/1986 | Crumbach et al. |
| 4,877,307 A | 10/1989 | Kalmanash |
| 5,321,443 A | 6/1994 | Huber et al. |
| 5,458,820 A | 10/1995 | Lefebvre |
| 5,598,231 A | 1/1997 | Lin |
| 5,702,813 A | 12/1997 | Murata et al. |
| 5,751,481 A | 5/1998 | Dalzell et al. |
| 5,805,336 A | 9/1998 | Dalzell et al. |
| 5,997,139 A | 12/1999 | Yasuda |
| 6,162,376 A | 12/2000 | Mead |

(Continued)

FOREIGN PATENT DOCUMENTS

| | | |
|---|---|---|
| CN | 1621910 A | 1/2005 |
| EP | 0299509 A2 | 1/1989 |

(Continued)

OTHER PUBLICATIONS

Bennett, Jean M. et al., Handbook of Optics, Section 10: Polarization, 10-1, 10-102, Paragraph 56, Walter G. Driscoll & William Vaughan eds., 1978, 14 pages.

(Continued)

*Primary Examiner* — Huy K Mai
(74) *Attorney, Agent, or Firm* — Kilpatrick Townsend & Stockton LLP

(57) ABSTRACT

Curved lenses configured to decode three dimensional content and method of fabricating the same. The lenses comprise a polyvinylalcohol polarizer film laminated with triacetate on both sides, wherein the polarizer film has a polarizing efficiency equal to or exceeding 99% and a transmittance percentage equal to or exceeding 35% and a retarder film (e.g., norbornene copolymer resin) laminated on a front surface of the polyvinylalcohol polarizer film laminated with triacetate and aligned to produce a desired circular polarization responsive to specified retardation wavelengths.

25 Claims, 6 Drawing Sheets

U.S. PATENT DOCUMENTS

| | | |
|---|---|---|
| 6,177,032 B1 | 1/2001 | Smith et al. |
| 6,367,930 B1 | 4/2002 | Santelices et al. |
| 6,786,599 B2 | 9/2004 | Hayashi |
| 6,801,360 B2 | 10/2004 | Phillips et al. |
| 6,951,681 B2 | 10/2005 | Hartley et al. |
| 7,036,932 B2 | 5/2006 | Boulineau et al. |
| 7,077,985 B2 | 7/2006 | Maki et al. |
| 7,289,257 B1 | 10/2007 | Hakagoshi |
| 7,517,081 B2 | 4/2009 | Lipton et al. |
| 7,524,053 B2 | 4/2009 | Lipton |
| 7,854,506 B1 | 12/2010 | Johnson et al. |
| 7,946,703 B2 | 5/2011 | Johnson et al. |
| 7,950,798 B2 * | 5/2011 | Johnson et al. .......... 351/159.59 |
| 7,964,121 B2 | 6/2011 | Hsu |
| 8,100,525 B2 | 1/2012 | Johnson et al. |
| 8,182,085 B2 | 5/2012 | Johnson et al. |
| 8,337,012 B2 | 12/2012 | Johnson et al. |
| 2006/0285026 A1 | 12/2006 | Robinson |
| 2007/0236809 A1 | 10/2007 | Lippey |
| 2007/0263169 A1 | 11/2007 | Lipton |
| 2008/0278807 A1 | 11/2008 | Richards et al. |
| 2009/0097117 A1 | 4/2009 | Coleman |
| 2011/0090454 A1 | 4/2011 | Johnson et al. |
| 2012/0147466 A1 | 6/2012 | Johnson et al. |
| 2012/0247653 A1 | 10/2012 | Johnson et al. |

FOREIGN PATENT DOCUMENTS

| | | |
|---|---|---|
| EP | 0505998 A2 | 9/1992 |
| JP | 2010 151954 A2 | 7/2010 |
| KR | 100720732 B1 | 5/2007 |
| WO | WO 2007-008777 A2 | 1/2007 |
| WO | WO 2010/032897 A2 | 11/2010 |
| WO | WO 2011/002897 A2 | 1/2011 |
| WO | WO 2011/050176 A2 | 4/2011 |

OTHER PUBLICATIONS

International Search Report and Written Opinion of the International Searching Authority in related International Application No. PCT/US09/030345 dated Sep. 30, 2009, 6 pages.

International Search Report and Written Opinion of the International Searching Authority in related International Application No. PCT/US10/040622 dated Feb. 9, 2011, 8 pages.

International Search Report and Written Opinion of the International Searching Authority in related International Application No. PCT/US10/035166 dated Dec. 23, 2010, 7 pages.

Request for Examination from related U.S. Appl. No. 12/604,155, now US Patent No. 7,584,506, 170 pages.

Office Action for corresponding Chinese application No. CN200980107287.5 dated Aug. 18, 2011, 5 pages.

Office Action for corresponding Chinese application No. CN200980107287.5 dated Feb. 21, 2012, 6 pages.

Office Action for corresponding Chinese application No. CN200980107287.5 dated Jun. 28, 2012, 7 pages.

Notification of the Grant of Patent Right for Invention for corresponding Chinese application No. CN200980107287.5 dated Oct. 31, 2012, 5 pages.

Non-Final Office Action for U.S. Appl. No. 12/350,092 mailed on Jun. 7, 2010, 7 pages.

Non-Final Office Action for U.S. Appl. No. 12/495,754 mailed on Jun. 14, 2010, 8 pages.

Notice of Allowance for U.S. Appl. No. 12/604,155 mailed on Oct. 7, 2010, 10 pages.

Notice of Allowance for U.S. Appl. No. 12/350,092 mailed on Feb. 7, 2011, 6 pages.

Notice of Allowance for U.S. Appl. No. 12/495,754 mailed on Feb. 11, 2011, 7 pages.

Non-Final Office Action for U.S. Appl. No. 12/973,620 mailed on Apr. 19, 2011, 7 pages.

Non-Final Office Action for U.S. Appl. No. 12/781,590 mailed on Dec. 23, 2011, 19 pages.

Notice of Allowance for U.S. Appl. No. 13/103,037 mailed on Jan. 31, 2012, 7 pages.

Final Office Action for U.S. Appl. No. 12/781,590 on May 25, 2012, 19 pages.

Notice of Allowance for U.S. Appl. No. 13/323,725 mailed on Aug. 23, 2012, 8 pages.

"Polarized 3D Glasses by 3D Glasses Direct" downloaded from Internet http://russian.circular-polarized-3dglasses.com, on Dec. 12, 2012, 1 page.

"New Circular Polarized 3d Glasses—Buy Polarized 3d Glasses", downloaded from Internet http://alibaba.com/product-gs/314540818/New_Circular_Polarized_3D_... On Dec. 18, 2012, 3 pages.

Office Action for corresponding Eurasian application No. 201070830 dated Dec. 18, 2012, 2 pages.

Notice of Allowance for U.S. Appl. No. 13/454,982 mailed on Nov. 27, 2012, 7 pages.

Notice of Allowance for U.S. Appl. No. 13/103,036 mailed on Jan. 1, 2013, 7 pages.

\* cited by examiner

FIG. 1

| CHECK POINT | | UNIT | SPECIFIED VALUE | ACTUAL VALURE |
|---|---|---|---|---|
| DIMENSIONS | WIDTH | MM | 495 ~ 505 | 495 |
| | LENGTH | MM | 700 ~ 710 | 700 |
| RETARDATION | θP | · | 0.0 ± 1.0 | -0.1 |
| | R | NM | ------- | ------- |
| | θR2 | · | 45.0 ± 1.0 | 45.1 |
| HUE | L | | 64.0 ± 16.0 | 63.8 |
| | A | | -1.40 ± 2.50 | -1.70 |
| | B | | 2.10 ± 2.50 | 2.73 |
| SINGLE TRANSMITTANCE | | % | 40.00 ± 2.50 | 41.77 |
| POLARIZING EFFICIENCY | | % | 99.80 | 99.96 |
| THICKNESS | | μM | 1050.0 ± 30.0 | 1046.0 |
| PEEL STRENGTH OF RELEASE FILM | | GF/25MM | ------- | ------- |
| CURL | | MM | -50.0 ≥ x ≤ +50.0 | 1.0 |
| UV-CUT | | % | 1.000 | 0.020 |
| HEAT RESISTANCE | | | 70°C / DRY / 240 HRS. | PSSED |
| HUMIDITY RESISTANCE | | | 40°C / 95%RH / 240 HRS | PSSED |
| APPEARANCE QUALITY | | | ------- | PSSED |

| CHECK POINT | | UNIT | SPECIFIED VALUE | ACTUAL VALURE |
|---|---|---|---|---|
| DIMENSIONS | WIDTH | MM | 495 ~ 505 | 495 |
| | LENGTH | MM | 700 ~ 710 | 700 |
| | θP | · | 0.0 ± 1.0 | -0.1 |
| RETARDATION | R | NM | ------- | ------- |
| | θR2 | · | 135.0 ± 1.0 | 134.9 |
| HUE | L | | 64.0 ± 16.0 | 64.6 |
| | A | | -1.40 ± 2.50 | -1.70 |
| | B | | 2.10 ± 2.50 | 2.73 |
| SINGLE TRANSMITTANCE | | % | 40.00 ± 2.50 | 41.77 |
| POLARIZING EFFICIENCY | | % | 99.80 | 99.96 |
| THICKNESS | | μM | 1050.0 ± 30.0 | 1058.0 |
| PEEL STRENGTH OF RELEASE FILM | | GF/25MM | ------- | ------- |
| CURL | | MM | -50.0 ≥ x ≤ +50.0 | 1.0 |
| UV-CUT | | % | 1.000 | 0.046 |
| HEAT RESISTANCE | | | 70°C / DRY / 240 HRS. | PSSED |
| HUMIDITY RESISTANCE | | | 40°C / 95%RH / 240 HRS | PSSED |
| APPEARANCE QUALITY | | | ------- | PSSED |

FIG. 2

| | ITEM | UNIT | DATA | STANDARD | | OK/NG |
|---|---|---|---|---|---|---|
| | | | | SL | SU | |
| | DIMENSION A | MM | 969.0 | 938.0 | 978.0 | |
| | DIMENSION B | MM | 503.0 | 480.0 | 520.0 | |
| | POLARIZING AXIS α | ° | -0.5 | -1.5 | 1.5 | |
| | LATE RITADATION AXIS β | ° | 135.5 | 133.5 | 136.5 | |
| | RITADATION | NM | 124.4 | 110.0 | 130.0 | |
| | THICKNESS | μM | 875.0 | 800.0 | 1000.0 | |
| | POLARIZER SIDE PROTECT FILM DETACHMENT POWER | N/25MM | 0.02 | | 0.98 | |
| | RITADATION FILM SIDE PROTECT FILM DETACHMENT POWER | N/25MM | 0.03 | | 0.98 | |
| | | | | | | |
| | | | | | | |
| | | | | | | |
| | | | | | | |
| | | | | | | |

*FIG. 3*

| ITEM | UNIT | DATA | STANDARD | | OK/NG |
|---|---|---|---|---|---|
| | | | SL | SU | |
| DIMENSION A | MM | 963.0 | 938.0 | 978.0 | |
| DIMENSION B | MM | 503.0 | 480.0 | 520.0 | |
| POLARIZING AXIS $\alpha$ | ° | 0.0 | -1.5 | 1.5 | |
| LATE RITADATION AXIS $\beta$ | ° | 45.1 | 43.5 | 46.5 | |
| RITADATION | NM | 122.7 | 110.0 | 130.0 | |
| THICKNESS | $\mu$M | 882.0 | 800.0 | 1000.0 | |
| POLARIZER SIDE PROTECT FILM DETACHMENT POWER | N/25MM | 0.03 | - | 0.98 | |
| RITADATION FILM SIDE PROTECT FILM DETACHMENT POWER | N/25MM | 0.03 | - | 0.98 | |
| | | | | | |
| | | | | | |
| | | | | | |
| | | | | | |
| | | | | | |

FIG. 4

CURVED LENSES CONFIGURED TO DECODE THREE-DIMENSIONAL CONTENT

CROSS-REFERENCES TO RELATED APPLICATIONS

This application is a continuation of U.S. patent application Ser. No. 12/350,092, filed on Jan. 7, 2009, which claims the benefit of U.S. Provisional Patent Application No. 61/019,545 filed Jan. 7, 2008. the disclosures of which are hereby incorporated by reference in their entirety for all purposes.

FIELD OF THE INVENTION

The embodiments of the present invention relate to lenses designed to decode three dimensional content displayed on television, movie, computer or similar screens or monitors.

BACKGROUND OF THE INVENTION

Three dimensional movies for theatres have been around for decades. With technological advances, three dimensional content is being developed for television, computer monitors and home projectors. In the past, and even today, special glasses allow users to view three dimensional content. Flat paper eyeglasses using red and green film for lenses are the primary glasses being used today. However, flat paper eyeglasses are not very effective for facilitating the desired three dimension effect. In addition, the flat paper eyeglasses are not comfortable and are generally viewed as a novelty. Other flat lenses suffer from the same drawbacks.

One advancement has been the development of linear and circular polarization for decoding three dimensional content. Despite the advancement, the lens and eyeglass technology has not advanced significantly.

Thus, there is a need for lenses that take advantage of the linear and circular polarization technologies while more effectively creating the desired three dimensional effect. Advantageously, the lenses and eyeglasses should provide improved optics and contrast while providing user comfort and versatility. It is also beneficial if the lenses may be mounted into stylish frames.

SUMMARY OF THE INVENTION

Accordingly, one embodiment of the present invention is a curved lens configured to decode three dimensional content comprising: a lens configured to decode three dimensional content comprising: a polarizing layer laminated with a polymeric material layer on one or both sides: a retarder layer laminated to a front of the polarizer layer directly or to the polymeric material to form a sheet. said retarder layer aligned to decode a desired circular polarization: and wherein a blank cut from the sheet is curved utilizing a thermoforming process to form said lens configured to decode three dimensional content Another embodiment of the present invention is a method of fabricating a curved lens configured to decode three dimensional content comprising: cutting blanks from sheets of material comprising: a polarizing layer laminated with a polymeric material layer on one or both sides: a retarder layer laminated to a front of the polarizer layer directly or to the polymeric material, said retarder layer aligned to decode a desired circular polarization, and wherein said blanks are cut to maintain a specified alignment of a polarizing axis associated with said sheet: heating the blanks to a deformation temperature: curving the blanks using vacuum suction and/or pressure: and cooling the curved blanks In one embodiment, the retarder is a norbornene copolymer resin such as an Afton film (manufactured by JSR Corp.) or Zenor film (manufactured by Zeon corp.). Conventional adhesives are used to bond the layers forming the lens. In one embodiment, a hard coating is applied to the front and back surfaces of the lens to allow for normal cleaning and extended life. In one embodiment, a lens thickness is between 750 and 1500 microns.

Other variations, embodiments and features of the present invention will become evident from the following detailed description, drawings and claims.

BRIEF DESCRIPTION OF THE DRAWINGS

FIGS. 1 and 2 illustrate an exemplary specification sheet for a first lens embodiment of the present invention;

FIGS. 3 and 4 illustrate an exemplary specification sheet for a second lens embodiment of the present invention;

DETAILED DESCRIPTION OF THE INVENTION

Figure 5:
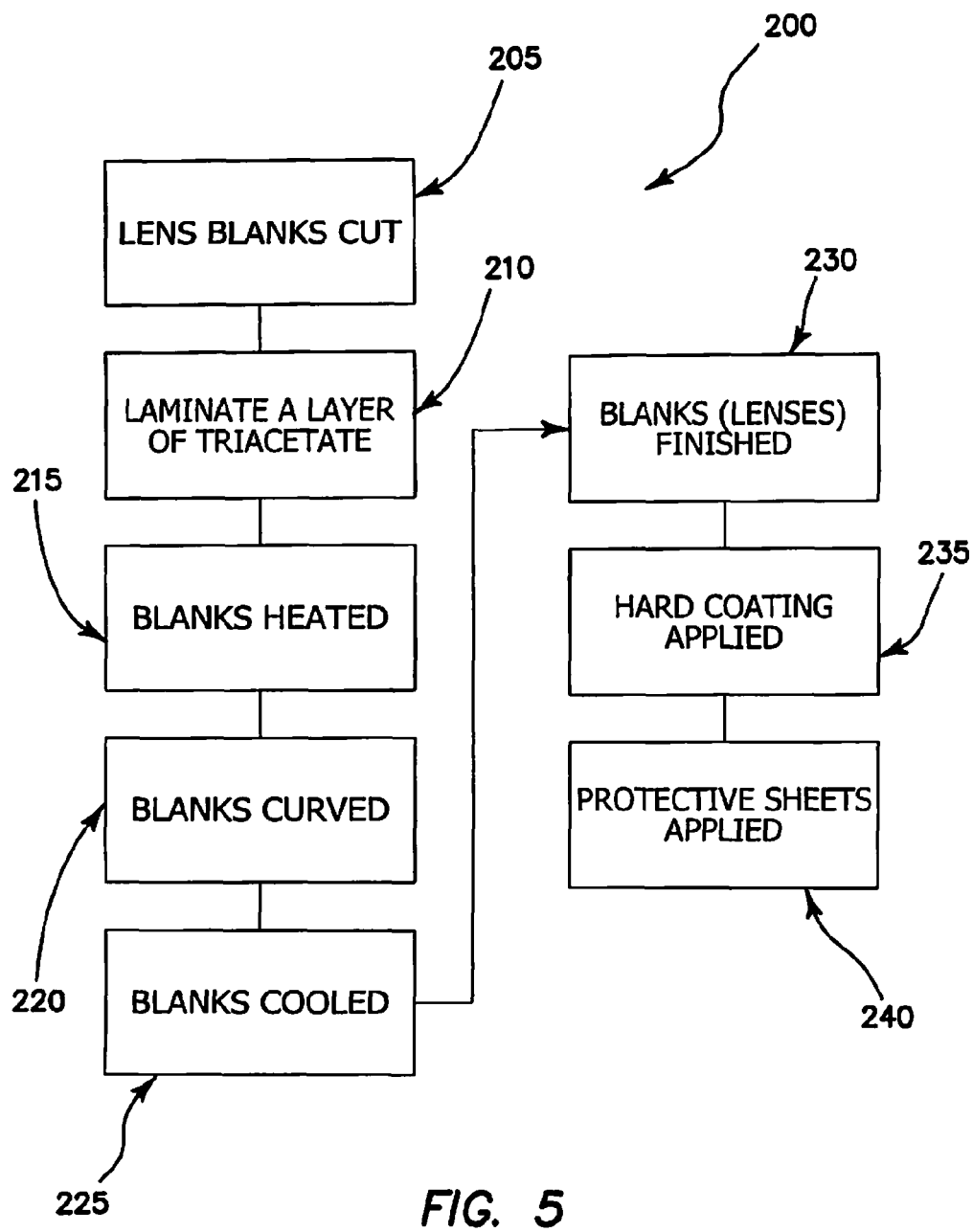
FIG. 5 illustrates a flow chart detailing one embodiment of manufacturing the lenses according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Traditionally flat lenses and frames have been used in 3D glasses. One problem with the flat 3D glasses is that the lenses are distanced from the user's face and more particularly the user's eyes. Thus, light is able to enter the user's eyes from the top, bottom and side of the lenses reducing the visual acuity and contrast thereby reducing the effectiveness of the 3D experience.

This is especially true at home or other locations outside of dark movie theatres. Moreover, the current one-size-fits-all approach to flat 3D eyeglasses reduces the quality of the 3D experience and in many cases results in an uncomfortable fit for most users. Accordingly, the embodiments of the present invention seek to overcome the disadvantages of the prior art flat 3D eyeglasses by creating 3D lenses and eyeglasses which are more akin to normal curved lenses and eyeglasses. Consequently, the lenses described herein are generally thicker than traditional flat 3D lenses and curved to prevent ambient light from interfering with the 3D experience. Conventional flat 3D paper lenses are 0.3 to 0.4 mm thick while the embodiments of the present invention are substantially in a range of 0.75 to 1.5 mm. The curvature further enables a better fit on the user's head. In addition, the thicker lenses enable them to be mounted into stylish frames to which people are more accustomed.

FIGS. 1-4 show specifications associated with lenses made utilizing the embodiments of the present invention. FIGS. 1 and 2 depict charts 100 and 105 listing lens specifications according to a first embodiment. The charts 100 and 105 depict dimensions, including width 110 and length 115, polarization angle 120, retardation angle 125, transmittance percentage 130, polarizing efficiency 135, thickness 140 and retardation 145. As shown in charts 100 and 105, the width ranges from 495 mm to 505 mm; length from 700 mm to 710 mm; polarization angle from −1.0 degree to 1.0 degree; retardation angle from 44.0 degrees to 46.0 degrees (or 134 degrees to 136 degrees); transmittance percentage from 37.5% to 42.5%; polarizing efficiency of 99% or greater; thickness of 1020 microns to 1080 microns (or 1.02 mm to 1.08 mm) and retardation of 110 to 130 nm. Larger ranges are possible for each of the aforementioned categories. Charts 101 and 106 shown in FIGS. 3 and 4, respectively, depict similar lens specifications according to a second embodiment.

Fabrication of the lenses is accomplished using lamination and thermoforming techniques. FIG. 5 shows a flow chart 200 detailing one method of fabricating lenses according to the embodiments of the present invention. At 205, lens blanks are cut from sheets of material comprising: polyvinylalcohol polarizer film laminated with triacetate on both surfaces (i.e., linear polarized film) and a retarder film laminated on a front surface thereof creating a circular polarized film. At 210, to reach a desired thickness (e.g., 0.9 mm), a layer of triacetate is laminated to the retarder film. A laminator machine forms the sheets of materials such that the axis of the polarizing film and retarder film are aligned properly to small tolerances. In one embodiment, the retarder is an Arton film (manufactured by JSR Corp.) or Zenor (manufactured by Zeon corp.). Polycarbonate materials may also be used as the retarder. Adhesives bind the materials together. The size of the blanks is dictated by the intended frame size. A typical size is 50 mm.times.70 mm. At 215, the blanks are placed into a thermoforming machine which heats the blanks to a deformation temperature (e.g., 90° C. to 130° C.). At 220, the heated blanks are curved to an optically correct curved surface utilizing vacuum suction and/or pressure. The higher the intended base curve (e.g., 4, 6 and 8), the higher the necessary thermoforming temperature and/or time of thermoforming. Once formed, at 225, the curved blanks are cooled and removed from the machine. At 230, the blanks, now lenses, can be finished with conventional lens dry cutting machines. At 235, a hard coating is applied over the curved lenses. Alternatively, the hard coat is applied to the sheet prior to thermoforming process. The hard coating allows normal cleaning and extended use while protecting the operational materials forming the lenses. At 240, a protective, removable sheets are applied to protect the lenses during subsequent operations including installation into frames, packaging and shipping.

The triacetate comprises multiple layers itself and has qualities, including transparency, stress-free, birefringence, lightweight and strength. Moreover, the triacetate is responsive to lamination and thermoforming processes and techniques.

For the circular polarized lenses utilized in the embodiments of the present invention the polyvinylalcohol polarizer film is tinted with iodine crystals to increase polarizing efficiency and transmission to acceptable levels (e.g., >99% and >35%, respectively).

The curved lenses disclosed herein have numerous advantages over the flat 3D glasses of the prior art. The curved lenses provide a clearer and natural vision of 3D images with greater acuity and contrast. More particularly, the curved lenses reduce light entering the user's eyes from the side, top or bottom of the eyeglass frames thereby increasing the comfort and contrast associated with the viewed 3D images. The curved lenses can be fitted into any commercial eyeglass frames to create as stylish pair of eyeglasses.

Figures 6A, 6B:
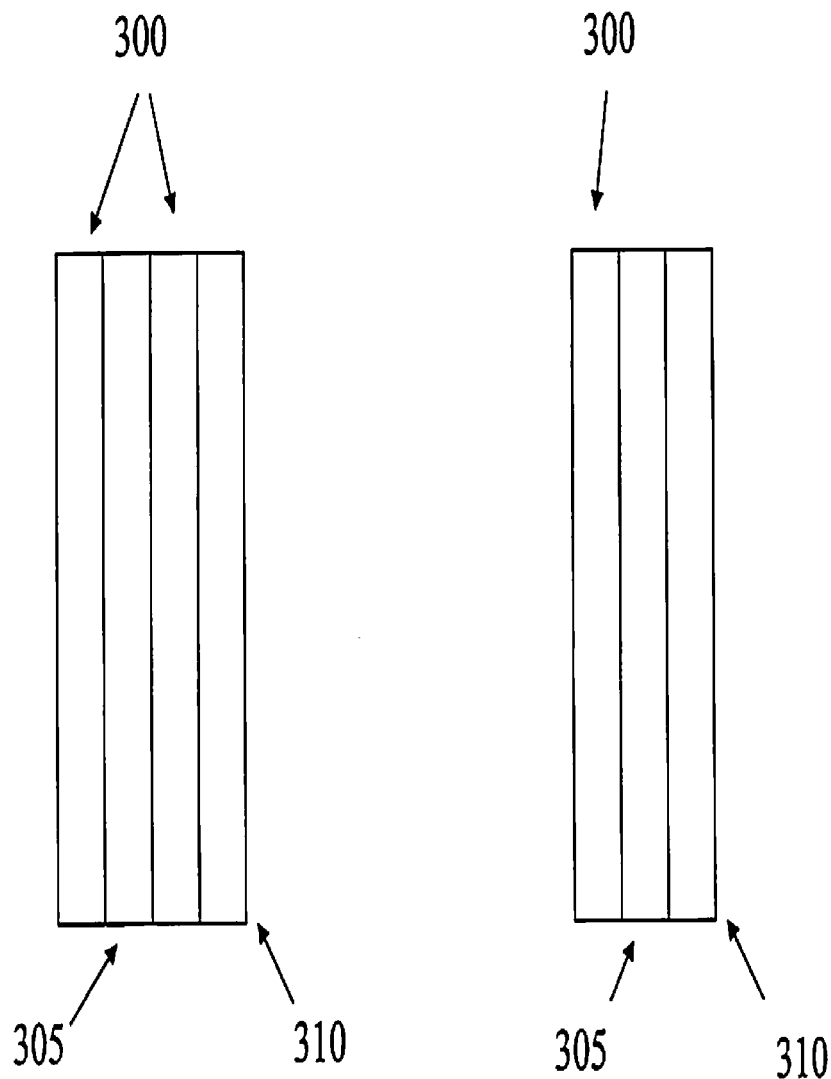
FIGS. 6a and 6b illustrate cross-sectional views of the lenses according to the embodiments of the present invention.

FIGS. 6*a* and 6*b* show cross-sectional views of the lenses according to the embodiments of the present invention comprising a polymeric material layer 300, polarizer layer 305 and retarder layer 310. FIG. 6*a* shows multiple polymeric material layers 300 (i.e., both sides of the polarizing layer 305) and FIG. 6*b* shows a single polymeric material layer 300.

Although the invention has been described in detail with reference to several embodiments, additional variations and modifications exist within the scope and spirit of the invention as described and defined in the following claims.

What is claimed is:

1. A lens configured to decode three dimensional content comprising:
   a curved blank comprising a polymeric material structure including:
   a polarizing layer laminated with a first polymeric material layer on a first side and a second polymeric material layer on a second side opposing the first side;
   wherein the polarizing layer has a polarizing efficiency equal to or exceeding 99% and a luminous transmittance equal to or exceeding 35%; and
   a retarder layer laminated to the second polymeric material layer, said retarder layer aligned to decode a desired circular polarization.

2. The lens of claim 1 further comprising a third polymeric material layer over the retarder layer.

3. The lens of claim 1 wherein at least one of said first polymeric material layer or said second polymeric material layer includes cellulose triacetate.

4. The lens of claim 1 wherein said polarizer layer is tinted with iodine crystals.

5. The lens of claim 1 wherein said retarder layer is norbornene copolymer resin, polyvinyl alcohol, polystyrene, polycarbonate, cellulose triacetate, cellulose diacetate, or polymethylmethacrylate.

6. The lens of claim 1 wherein the polarizing layer is characterized by a polarization angle in a range of about −1.0 degree to 1.0 degree.

7. The lens of claim 1 wherein the retarder layer is characterized by a retardation angle in a range of about 44.0 degrees to 46.0 degrees.

8. The lens of claim 1 wherein the retarder layer is characterized by a retardation angle in a range of about 134.0 degrees to 136.0 degrees.

9. The lens of claim 1 wherein the lens is characterized by a thickness in a range of about 750 microns to 2000 microns.

10. The lens of claim 1 wherein the lens is characterized by a lens retardation in a range of about 110 nm to 140 nm.

11. A method of fabricating a curved lens configured to decode three dimensional content, the method comprising:
   receiving a sheet of material comprising:
      a polarizing layer laminated with a polymeric material layer on both sides;
      a retarder layer laminated to the polymeric material layer, said retarder layer aligned to decode a desired circular polarization;
   cutting blanks from said sheet of material to maintain a predetermined alignment of a polarizing axis associated with said sheet; and
   heating the blanks to a deformation temperature;
   curving the blanks using at least one of vacuum suction or pressure; and
   cooling the curved blanks.

12. The method of claim 11 wherein the polarizing layer is characterized by a polarizing efficiency equal to or exceeding 99% and a luminous transmittance equal to or exceeding 35%.

13. The method of claim 11 further comprising laminating a polymeric material layer over the retarder layer.

14. The method of claim 11 wherein the deformation temperature is in a range of 90° C. to 130° C.

15. The method of claim 11 wherein the curved lens is characterized by a polarization angle in a range of −1.0 degree to 1.0 degree.

16. The method of claim 11 wherein the curved lens is characterized by a retardation angle in a range of about 44.0 degrees to 46.0 degrees.

17. The method of claim 11 wherein the curved lens is characterized by a retardation angle in a range of about 134.0 degrees to 136.0 degrees.

18. The method of claim 11 wherein the curved lens is characterized by a transmittance percentage exceeding 35%.

19. The method of claim 11 wherein the curved lens has a thickness in a range of about 750 microns to 2000 microns.

20. The method of claim 11 wherein the curved lens is characterized by a retardation in a range of about 110 nm to 140 nm.

21. The method of claim 11 wherein the retarder layer comprises a norbornene copolymer resin.

22. The method of claim 11 wherein the polymeric material layer includes cellulous triacetate.

23. Eyeglasses comprising:
a frame configured to retain a first lens and second lens;
wherein the first lens comprises a curved blank comprising a first polymeric material structure and the second lens comprises a curved blank comprising a second polymeric material structure;
wherein the first polymeric material structure and the second polymeric material structure comprise a polarizing layer having a polymeric material layer on both sides of the polarizing layer and a retarder layer laminated to one of the polymeric material layers;
wherein the retarder layer of the first polymeric material structure is aligned to decode light having a left handed circular polarization and the retarder layer of the second polymeric material structure is aligned to decode light having a right handed circular polarization.

24. The eyeglasses of claim 23 wherein the left lens utilizes a retardation angle in a range of about 134.0 degrees to 136.0 degrees.

25. The eyeglasses of claim 23 wherein said left lens utilizes a retardation angle in a range of about 44.0 degrees to 46.0 degrees.

* * * * *